APPARATUS FOR INSERTING COMPONENTS INTO A CIRCUIT BOARD

Filed July 15, 1965 2 Sheets-Sheet 1

INVENTORS
JOHANNES M. REIJNHARD
CORNELUS M.M. WEUERS
BY
Frank R. Trifari
AGENT

INVENTORS
JOHANNUS M. REIJNHARD
CORNELUS M.M. WEIJERS
BY
Frank R. Trifari
AGENT

United States Patent Office 3,327,375

Patented June 27, 1967

3,327,375

APPARATUS FOR INSERTING COMPONENTS INTO A CIRCUIT BOARD

Johannes Martinus Reijnhard and Cornelus Monse Martinus Weijers, both of Emmasingel, Eindhoven, Netherlands, assignors to North American Philips Company, Inc., New York, N.Y., a corporation of Delaware Filed July 15, 1965, Ser. No. 472,248
Claims priority, application Netherlands, July 16, 1964, 6,408,087
4 Claims. (Cl. 29—203)

The invention relates to apparatus for inserting electrical components into apertures of a mounting panel, the said components being each provided with parallel lead wires projecting therefrom in the same direction and at least one reference member which extends at least over part of the length of the body of the component.

Such apparatus is generally constructed for inserting one component at a time into a mounting panel. In the known apparatus a series of component mounting heads is necessary to insert all the components successively on the mounting panel. Apparatus is known, from U.S. Patent No. 3,200,481, for simultaneously inserting several components into a mounting panel. This device comprises a number of arms pivotably arranged around the mounting panel, the ends of the said arms comprising an inserting member. By rotating the arms around their pivot shafts, the inserting members can swing from a supply device, where components are taken up to the inserting head and transferred to the mounting panel, where the components are inserted. However, the construction of such apparatus is complicated and further it is not always possible to simultaneously insert any desired number of components, since the inserting members requiring a comparatively large space above the mounting panel as a result of which the number of inserting members which can be used in restricted.

The object of the invention is to provide a simple device for simultaneously inserting any desired number of components into a mounting panel.

Figure 1:
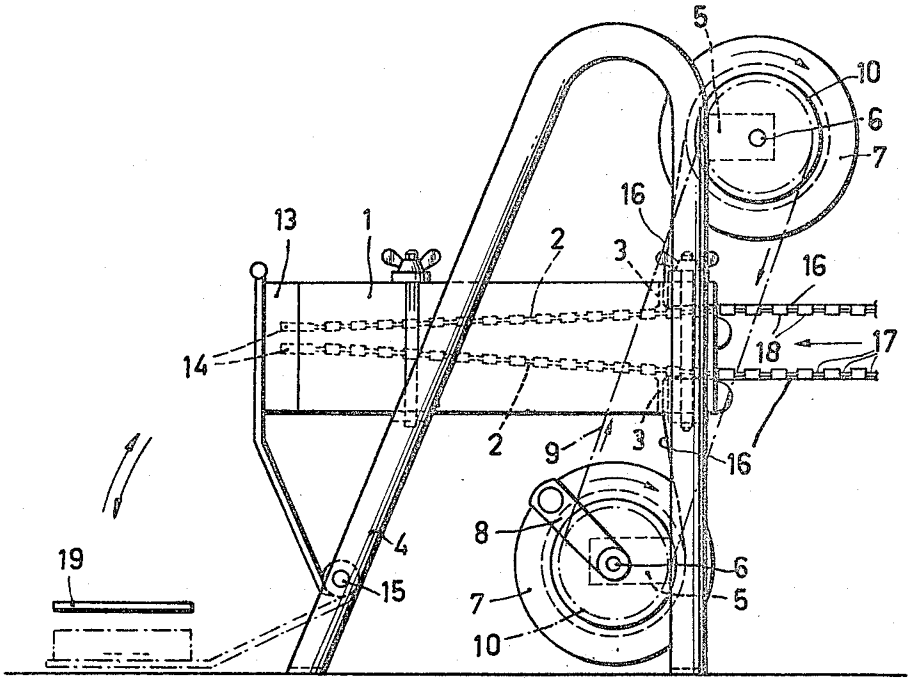
Figure 2:
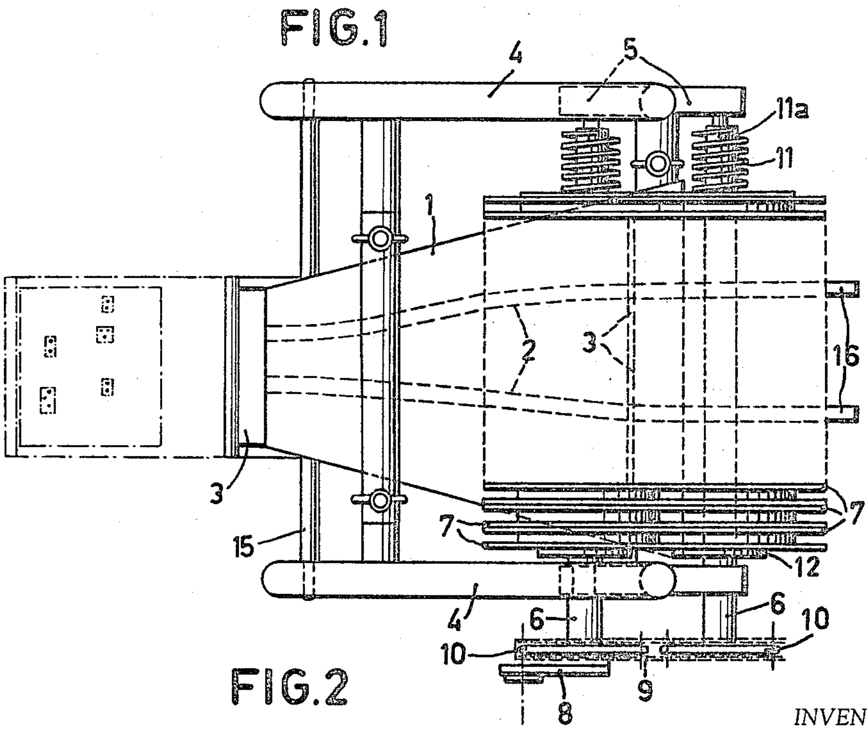
Figure 3:
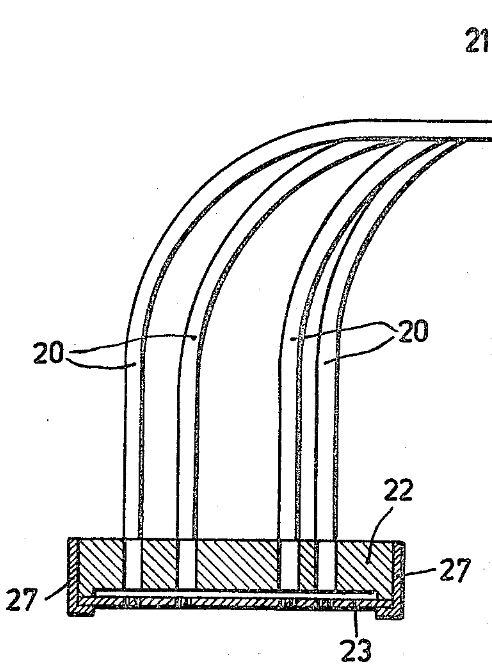
Figure 4:
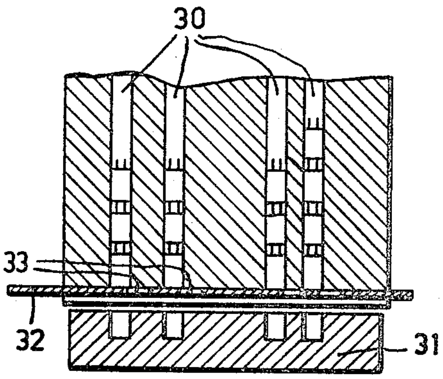

In order that the invention may readily be carried into effect it will now be described in greater detail, by way of example, with reference to the accompanying drawings, in which:

FIG. 1 is a side elevation of an embodiment of the apparatus according to the invention, FIG. 2 is a top plan view of the apparatus shown in FIG. 1, FIG. 3 is a detailed view of a feature of the apparatus according to the invention, and FIG. 4 is a detailed view of a modification of the apparatus according to FIG. 3.

The apparatus shown in FIGS. 1 and 2 comprises a block 1 provided with corridors 2 of which only two are shown for clarity. The block 1 consists, for example, of a casting of a synthetic material in which the corridors 2 are formed by moulding the synthetic material around cores and afterwards removing the cores. The supply apertures for each of the corridors 2 in the embodiment shown in FIGS. 1 and 2 are provided in the right end surface of the block 1 as seen in FIG. 1. At some distance beyond the supply apertures of the corridors 2 slots 3 are provided which extend from the upper and lower sides of the block 1 to the corridors 2.

The block 1 is supported by a stand 4. This stand comprises arms 5 in which shafts 6 are journalled. A number of discs 7 are journalled on the shafts 6 and rotate in the direction of the arrow. The shafts 6 are driven by a drive mechanism (not shown) acting upon a crank 8. The two shafts 6 are simultaneously driven by means of a chain 9 which is guided over sprocket-wheels 10. The discs 7 are forced against one another and a shoulder 12 fixed on the shaft 6 by a spring 11 thus forming a friction clutch for each disc. The stress of the spring 11 can be adjusted so that the discs 7 will slip at a given load. The adjustment of the spring stress can take place, for example, by rotating the spring 11 with respect to a pin 11*a* fixed in the shaft.

The corridors 2 are provided in the block 1 in a manner such that their emerging apertures are located in a given pattern in the left end surface of the block 1 as seen in FIG. 1. This pattern corresponds to the pattern in which the components will be arranged on the mounting panel. When the ends of the corridors are located quite close to one another, a thin wall may be provided at the area in the block 1 as a partition between the corridors (not shown). A holder 13 is pivotably secured to the stand 4. The holder 13 has a plurality of apertures 14 which are located with respect to one another in a pattern corresponding to the emerging apertures of the corridors 2. The holder 13 is pivotable, around the pivot shaft 15, from a position in which it engages the end of the block 1 into a position in which it is, for example, horizontal as indicated in broken lines in FIG. 1.

The operation of the device is as follows. The components 18, the body of each of which has, for example, a rectangular cross-section, are glued in tandem on narrow tapes 16 with the parallel lead wires projecting rearwardly or to the right in FIG. 1. The narrow tapes 16 and associated component 18 are introduced into the corridors 2. However, each tape is thereafter guided to one of the discs 7 through the slots 3 in body 1. The components 18 are released from the adhesive tape 16 and pass over slots 3. Each component is pushed forward by the successive components along the corridors 2 inwardly beyond slots 3. Let it be assumed that the corridors are filled entirely with components. The holder 13 is moved towards the block 1. When the holder engages the block 1 the shaft 6 is rotated, through a mechanism acting upon the crank 8, through such an angle that the circumference of the disc 7 on which the tapes 16 are guided covers a distance which is somewhat larger than the distance between the end faces of two successive components 18 fixed on the tape. The components all slide into the corridor until the front components abut against the bottom faces of the recesses 14 provided in the holder 13. The shaft 6 continues its rotation somewhat further to ensure that the components entirely engage in the recesses 14. Since, however, the discs 7 engage the shoulder 12 on the shaft 6 with spring pressure forming a friction clutch, the discs 7 can slip relative to shaft 6 or shoulder 12 as a result of which the tapes cannot be wound further on the discs and only slight pressure, as a result of sliding friction of the clutch, is exerted on the components in the corridors. After the drive of the crank 8 has been switched off, the holder 13 is moved to the horizontal position shown in broken line FIG. 1. There a mounting panel or circuit board 19 is arranged above the holder and moved downward towards the holder, all projections or leads 17 are therefore simultaneously slid into the apertures of the mounting panel destined to receive them. When the components are headed or provided with clips (U.S.P. 3,133,774) which secures the leads in the apertures of the panel, the mounting components can be separated from the holder and the projections connected to the printed wiring, for example by dip soldernig. Alternatively it is possible to secure the holder in a detachable manner to the pivot arm support therefor. Then the holder may also serve as a press for holding the components in the circuit board during dip soldering. The holder is used as a press when the projections of the components are not headed or clamped in the apertures of the mounting panel.

The components may alternatively be secured directly in the mounting panel, without interposing a holder. In this case the components are glued on the tapes 16 and pushed through the corridors as before. The mounting panel is provided in the place of a holder arranged at the ends of the corridors. The projections of the components slide into the respective apertures of the mounting panel. After the drive of the crank 8 has been switched off the mounting panel with inserted components can be removed from the holder.

It is not necessary to provide the corridors 2 in the block 1, the corridors may alternatively consist, for example, of tubes (opened or closed) having a rectangular cross-section. These tubes may be manufactured from metal but alternatively, for example, from a stiff synthetic material.

FIG. 3 shows an embodiment of the invention in which the corridors consist of flexible hoses 20. These hoses 20 which, for example, have a square cross-section, may be manufactured from flexbile plastics. The hoses extend between a supply mechanism 21 to which the components are fed and a holder 22 for a mounting panel 23. In the embodiment shown the components are transported from a store 24 to the mounting panel by means of compressed air. FIG. 3 shows a cross-sectional view through one of the supply devices of the apparatus. When a plunger 25 moves to the righthand side in FIGURE 3 it closes a supply of air to the duct 26 via a mechanism not shown. One component falls out of the store 24 into the plunger duct. Then the plunger 25 moves to the left-hand side of the figure taking along the component. When the plunger arrives in the position shown, air is supplied through the duct 26, and the component is transported through hose 20 to the mounting panel 23 by the pressure of the air. The projections slide into the apertures of the mounting panel as before. In this manner all the components can be simultaneously inserted into the mounting panel. When the plunger then moves to the right-hand side in the figure the supply of air through duct 26 is closed again and the mountnig panel with the inserted components can be removed from the holder. The placing into and the taking out of the holder of the mounting panels can be simplified by using detachable braces 27.

FIG. 4 shows a device according to the invention in which the components move out of the corridors 30 towards a holder 31 as a result of gravity, a slide 32 controls the supply of the components to the holder. The slide 32 is provided for that purpose with recesses 33 which are located in a pattern corresponding to the pattern of the emerging apertures of the corridors 30. Normally the slide closes the corridors. When the holder 31 is arranged below the corridors, the slide 32 is moved sideways to such an extent (by means which are not shown) that one component falls out of each corridor through the aperture of the slide into the recesses of the holder. Then the slide is again moved to its blocking position and the holder with inserted components can be removed.

What is claimed is:

1. Apparatus for inserting electrical components into a receiving means comprising a plurality of guide corridor means having a cross-sectional configuration corresponding to the cross-sectional configuration of said electrical components, body means containing and supporting said guide corridor means, means attached to said body means for feeding said electrical components into said guide corridor means, holding means for receiving said electrical components comprising a plate shaped member having a plurality of openings in one surface thereof, said member surface adapted to be positioned in opposed relation to the egress portion of said corridor means, with each of said openings having a cross-sectional configuration corresponding to the guide corridor means which said opening opposes, said holding means being movably mounted on said body means, and means to release a single component from each of said guide corridor means for insertion into said holding means.

2. Apparatus according to claim 1 wherein said means for ejecting one component at a time from each said corridor comprises a slide member overlying said egress portions of said corridors, said slide member having apertures therethrough, said slide apertures defining said pattern, said slide being movable from a position in which said slide apertures and the egress portions of said corridors are coaxial to a position of misalignment thereof.

3. Apparatus according to claim 1 wherein said means for feeding said components comprises tape means having said electrical components removably adhered thereto, a slot adjacent the entrance portion of each of said guide corridor means, a take-up reel means and drive means attached to said reel means, said take-up reel means being aligned with said slot means, with said tape means passing through said corridor means and slot and engaging said take-up reel means, whereby driving said take-up reel winds up said tape and feeds said components into said guide corridor means.

4. Apparatus according to claim 3 wherein said attachment between said take-up reel means and said drive means includes a clutch means for limiting the driving force applied to said tape means.

References Cited

UNITED STATES PATENTS

| | | | |
|---|---|---|---|
| 3,020,630 | 2/1962 | Weinstein | 29—211 |
| 3,037,268 | 6/1962 | Mitchell et al. | 29—203 |
| 3,061,919 | 11/1962 | Tack | 29—203 X |
| 3,127,669 | 4/1964 | Reber et al. | 29—211 X |

JOHN F. CAMPBELL, *Primary Examiner.*

THOMAS H. EAGER, *Examiner.*